FIP8212 XR 3,374,395

250/201

March 19, 1968 M. DONKERS ET AL 3,374,395

CIRCUIT ARRANGEMENT FOR LUMINOUS ADVERTISING IN WHICH THE LIGHT SOURCES FLASH UP CONSECUTIVELY AND ARE SIMULTANEOUSLY EXTINGUISHED

Filed March 4, 1965 2 Sheets-Sheet 1

INVENTORS
MATHIAS DONKERS
ENGBERT B.G. NIJHOF

BY

Frank R. Trifari

AGENT

INVENTORS
MATHIAS DONKERS
ENGBERT B.G. NIJHOF
BY
Frank R. Jifani
AGENT

United States Patent Office
3,374,395
Patented Mar. 19, 1968

3,374,395

CIRCUIT ARRANGEMENT FOR LUMINOUS ADVERTISING IN WHICH THE LIGHT SOURCES FLASH UP CONSECUTIVELY AND ARE SIMULTANEOUSLY EXTINGUISHED

Mathias Donkers and Engbert Bernard Gerard Nijhof, Emmasingel, Eindhoven, Netherlands, assignors to North American Philips Company, Inc., New York, N.Y., a corporation of Delaware Filed Mar. 4, 1965, Ser. No. 437,180
Claims priority, application Netherlands, Mar. 7, 1964, 64—2,377
14 Claims. (Cl. 315—151)

Figure 1:
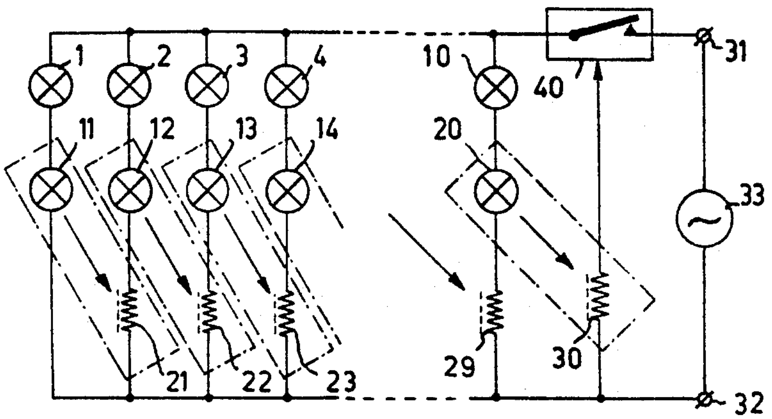

This invention relates to apparatus for sequentially energizing a group of lamps, or the like. In particular, the invention relates to a circuit arrangment for luminous advertising in which a group of light sources, arranged in a given pattern, flash up consecutively and are simultaneously extinguished.

Known circuit arrangements for luminous advertising employ mechanical contacts, which, however, have various disadvantages, e.g., they are noisy, a source of electric interference and occupy a comparatively large space.

The invention has for its object to obviate these disadvantages. It is characterized by the use of optical coupling of the circuits including the light sources in combination with a light-sensitive element which is illuminated by a light radiating element in the circuit including the last light source to be energized in the cycle. The light-sensitive element controls an electric gate so that the light sources are extinguished simultaneously by said control.

According to a further aspect of the invention, a delay network is connected between the light-sensitive element and the electric gate. The delay network provides a time lag between the variation of the resistance of the light radiating element and the control of the electric gate.

In an advantageous embodiment of the invention the delay network controls a gas discharge lamp which illuminates a photo-resistor so that the control-voltage of the gate, preferably a controlled rectifier, is affected.

Each light source is connected preferably in series with a light radiating element which is optically coupled with a light-sensitive element which is connected in series with the next subsequent light source to be ignited. Such a light radiating element may, moreover, be optically coupled with a light-sensitive element which is connected in series with the light radiating element concerned.

It should be noted that it is known per se to cause light sources arranged in a given pattern to flash up consecutively by means of photocells connected in series with the light sources and irradiated by the light source in the preceding series combination of light source and photocell.

In this known arrangement, however, the light sources are not simultaneously switched off after they have flashed up consecutively, since photocells are not appropriate to switch off high currents. Moreover, in the known arrangement the light sources have two functions: they form part of the light pattern to be produced and they serve as through-connection elements. This combination of functions may readily give rise to undesirable effects.

The invention will be described more fully with reference to the drawing, which shows in FIG. 1 a basic diagram of the arrangement of the invention, in FIG. 2 a variant of said diagram and in FIG. 3 an embodiment of an arrangement according to the basic diagram of FIG. 1.

As shown in FIG. 1, the light sources 1 to 10, five of which are shown, are connected by means of a switch 40 to the alternating voltage source 33. The light sources are included in a number of parallel circuits each comprising the series combination of a light source (2, 3, . . . 10), a lamp (12, 13, . . . 20) and a photo-resistor (21, 22, . . . 29). The lamp 11 is connected in series only with the light source 1. If the switch 40 is closed, the light source 1 and the lamp 11 are ignited to initiate a cycle. The other light sources and lamps do not ignite initially, since they are connected in series with high-ohmic photo-resistors.

The lamp 11 illuminates the associated photo-resistor 21 thereby lowering its resistance so that the light source 2 and the lamp 12 can ignite. The lamp 12 in turn illuminates the photo-resistor 22 which allows light sources 3 and 13 to ignite, and so on down the line to light source 10. The lamp 20 ignites simultaneously with the light source 10 and illuminates the photo-resistor 30, which thus becomes low-ohmic. The photo-resistor 30 controls the switch 40, which switches off the voltage source 33 from the light source $t_1$ seconds after the photo-resistor 30 has become low-ohmic. All light sources are simultaneously extinguished. The photo-resistor 30 then becomes high-ohmic. After $t_2$ seconds the switch 40 is again switched on and the cycle restarts. Both the time $t_1$ and the time $t_2$ are adjustable in a manner to be described hereinafter.

The light sources 1 to 10 produce the desired text or figure. The lamps 11 to 20, combined with the photo-resistors 21 to 30, constitute a counter which comprises ten light-tight units 11, 21; 12, 22; . . . ; 20, 30.

Figure 2:
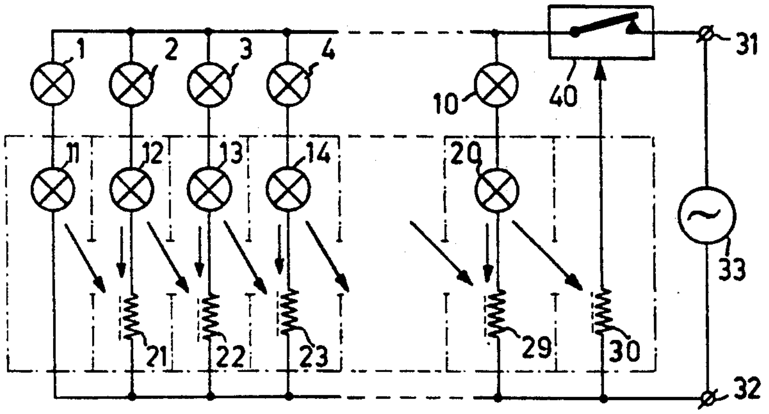

The arrangement shown in FIG. 2 exhibits great simiiarity to that of FIG. 1. However, as shown in FIG. 2, the photo-resistors 21 to 29 are not only illuminated by the lamps 11, . . . , 19 of the preceding stage but also by the lamps 12, . . . , 20, which are connected in series with the photo-resistors 21, . . . , 29 concerned. The combinations 11, 21; 12, 22; . . . ; 20, 30 again constitute a counter. The combinations 12, 21; 13, 22; . . . ; 20, 29 constitute each a holding circuit.

If one of the lamps, after having illuminated a photo-resistor in the next-following stage, extinguishes, this photo-resistor remains low-ohmic due to the illumination by the series-connected lamp. All stages but one remain operative.

The counter 11, 21; 12, 22; . . . ; 20, 30 is housed in a single light-tight envelope and the coupling between two stages is obtained through a small aperture in the partition between two stages.

Figure 3:
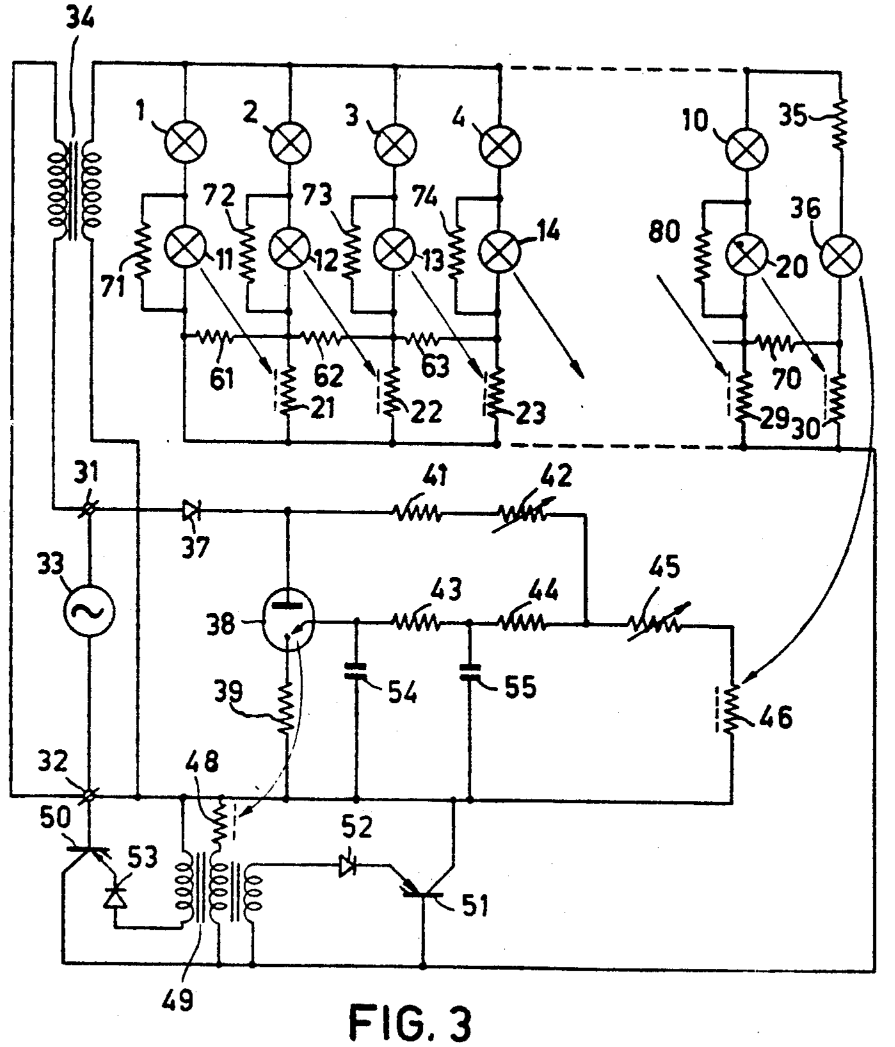

FIG. 3 shows the embodiment of an arrangement, the basic diagram of which is shown in FIG. 1. Corresponding circuit elements of the two figures are designated by the same reference numerals.

The resistors 71 to 80 connected across the lamps 11 to 20 serve to adjust the lamps 11 to 20 to such a sub-standard voltage that their lifetime is prolonged. The resistors 61 to 70 guarantee a satisfactory operation of the counter. If one or two lamps, for example, 12 or 13, or 12 and 13 become defective, the lamp 14 ignites in the latter case by means of a path including the low-ohmic photo-resistor 21 and the resistors 62 and 63.

When the photo-resistor 30 is illuminated by the lamp 20, this resistor becomes low-ohmic and the lamp 36 is ignited. The photoresistor 46, included in the control-circuit of the gas discharge lamp 38, is illuminated by the lamp 36 and thus becomes low-ohmic. The gas discharge lamp 38 is in optical contact with the photo-resistor 48, which is connected in series with the primary winding of the transformer 49 across the controlled rectifiers 50 and 51, connected in parallel opposition. The alternating voltage source 33 supplies energy to the gas discharge lamp 38 by means of a diode 37, and to the luminous display by means of the transformer 34 and the controlled rectifiers 50 and 51.

The operation of the switch 40 (see FIGS. 1 and 2) will be explained with reference to the arrangement shown in FIG. 3.

If the last light source 10 of the advertising arrangement has not yet ignited, the photo-resistor 30 is high-ohmic and the lamp 36 has not yet ignited. The photo-resistor 46 is therefore also high-ohmic. The voltage at the junction of the potentiometer resistors 42 and 45 is so high that a sufficiently high control-voltage prevails at the control-electrode of the lamp 38 for this lamp 38 to be held in the ignited state. Therefore, the resistor 48 optically coupled therewith is low-ohmic. Part of the voltage supplied by the voltage source 33 through the transformer 34 prevails across the primary winding of the transformer 49. A voltage is produced across the secondary windings of the transformer 49 and this voltage furnishes through the safety diodes 52 and 53 a control-voltage for the controlled rectifiers 51 and 50, which are thus alternately conducting.

The secondary voltage of the transformer 34, apart from the voltage losses in the rectifiers 50 and 51, is then fully connected to the luminous advertising arrangement, so that the "writing" advertising is rendered visible.

When the lamp 20 is ignited, the photo-resistor 46 becomes low-ohmic, as stated above, by virtue of the operation of the photo-resistor 30 and the lamp 36. The voltage division across the potentiometer 41, 42, 45, 46 is thus varied so that the voltage at the junction of the resistors 45 and 46 is reduced. The control-voltage of the gas discharge lamp 38 then drops to the value of the voltage at this junction so that the lamp 38 extinguishes. The period of time required for this voltage drop depends upon the RC-time of the network 41, 42, 44, 45, 46, 55.

When the lamp 38 extinguishes, the photo-resistor 48 becomes high-ohmic and consequently, the voltage-drop across the primary winding of the transformer 49 becomes negligible. The rectifiers 50 and 51 pass to the cut-off state. The luminous advertising arrangement is substantially without voltage. The light sources 1 to 10 extinguish simultaneously, as do the lamps 11 to 20 and 36. It will be obvious that the RC-time of the network 41, 42, 44, 45, 46, 55 determines the major part of the period of time between the instant when the luminous advertising is fully operative and the instant when it is switched off. This time may be varied, for example, by using a variable resistor 45.

When the luminous advertising is switched off, the lamp 36 is also extinguished and the resistor 46 again becomes high-ohmic. The control-voltage of the lamp 38 is again raised to its initial high value so that lamp 38 ignites and irradiates photo-resistor 48. The time required to accomplish this may be varied by means of the resistor 42, which determines the charging current of the capacitor 55. The cycle is now repeated.

The discharge time and the charge time of the capacitor 55 are, in general, different, since the charging circuit and the discharging circuit are different.

In an embodiment of the arrangement of FIG. 3, the light sources 1 to 10 were incandescent lamps of an experimental type, having a burning voltage of 40 v. and a nominal current of 60 ma. The lamps 11 to 20 and 36 were experimental lamps having a burning voltage of 24 v. and a nominal current of 60 ma. The photo-resistors 21 to 30 were experimental resistors.

The resistors 71 to 80 had a value of 1500Ω, the resistors 61 to 70 a value of 680Ω, the resistor 35 a value of 1KΩ. The gas discharge lamp 38 was an experimental lamp. The resistors 39, 41, 42, 43, 44 and 45 had values of 7KΩ, 47KΩ, 100KΩ, 1MΩ, 82KΩ, and 500KΩ.

The capacitor 54 had a value of 330 pF and the capacitor 55 a value of 16μF.

The photo-resistors 46 and 48 were experimental types.

The diodes 37 were of the type BY 100, the diodes 52 and 53 of the type OA 7, the controlled rectifiers 50 and 51 of the type BTY 88.

The voltage source 33 was formed by the house supply of 220 v.

The voltage on the secondary side of the transformer 34 was 60 v., when the rectifiers 50 and 51 were conducting.

It is possible to provide alternately a dark "travelling" and a luminous "travelling" advertising by including the switch 40 in the series circuit having the lamps 1 and 11.

As a matter of course, the arrangement of FIG. 2 may be safeguarded against defects of the lamps 11 to 20 by arranging the light coupling between successive stages so that the light from any lamp not only strikes the photo-resistor in the next-following stage, but also the photo-resistor in a second (and even third) further stage.

We claim:

1. A circuit for sequentially energizing a plurality of electric light sources arranged in a given pattern comprising, a source of energizing voltage, electronic gate means, a plurality of light-sensitive elements, means connecting a first one, a second one, a third one, and so on, of said light sources in series with a first one, a second one, a third one, and so on of said light-sensitive elements, respectively, said light sources and said light-sensitive elements being arranged so that said light sources are individually optically coupled in sequence to adjacent light-sensitive elements, means connecting said electronic gate means in series between said voltage source and said plurality of series connected light sources and light-sensitive elements to control the energization thereof, means for exciting the first light-sensitive element in the sequence thereby to initiate a cycle wherein said light sources are sequentially energized as the respective series connected light-sensitive elements are sequentially illuminated by the respective light sources optically coupled therewith, a light-sensitive control element optically coupled to the last one of said light sources in the sequence and arranged to control the state of said electronic gate means so as to simultaneously de-energize said light sources at the end of a cycle, and a delay network coupled between said light-sensitive control element and said electronic gate means for providing a time delay between the activation of said control element and said control of said electronic gate means.

2. A circuit as claimed in claim 1 wherein said delay network includes a capacitor, means providing a charge path for said capacitor having a given time constant, and means providing a discharge path for said capacitor having a time constant that is different than said given time constant.

3. A circuit as claimed in claim 1 further comprising a plurality of light emitting elements exposed to view, and means connecting one each of said light emitting elements in individual series circuits with said plurality of light sources and said plurality of light-sensitive elements.

4. A circuit as claimed in claim 3 wherein said first, second, third and so on light sources are further arranged to be individually optically coupled with said first, second, third, and so on light-sensitive elements, respectively, that are connected in series therewith.

5. A circuit as claimed in claim 1 wherein said first, second, third, and so on light sources are further arranged to be individually optically coupled with said first, second, third, and so on light-sensitive elements, respectively, that are connected in series therewith.

6. A circuit as claimed in claim 1 further comprising a plurality of impedance elements successively bridging adjacent ones of said light-sensitive elements to provide alternate current paths for the current flowing through said light sources.

7. A circuit as claimed in claim 3 further comprising a plurality of impedance elements successively bridging adjacent ones of said light-sensitive elements to provide alternate current paths for the current flowing through said light sources.

8. A circuit as claimed in claim 1 wherein said electronic gate means comprises a controlled rectifier having first and second electrodes which define a current path therein and a control electrode for controlling the current flow in said path, means connecting said first and second electrodes in series with said voltage source and said plurality of light sources and light-sensitive elements, a photo-responsive resistor element coupled to said control electrode, a gas discharge lamp optically coupled to said photo-responsive resistor, said discharge lamp having a control electrode coupled to said delay network whereby the energization of said discharge lamp is controlled by said delay network.

9. A circuit as claimed in claim 8 comprising a further light source connected in series with said light-sensitive control element, and a further light-sensitive element electrically coupled to said delay network and optically coupled to said further light source.

10. A circuit for sequentially energizing a plurality of electric light sources arranged in a given pattern comprising, a source of energizing voltage, electronic gate means, a plurality of light-sensitive elements, a plurality of light radiating elements, means connecting a first one of said light sources, a first one of said light radiating elements and a first one of said light-sensitive elements, in that order, in a first series circuit, means connecting a second one of said light sources, a second one of said light-radiating elements and a second one of said light-sensitive elements, in that order, in a second series circuit, and so on including the last of said light sources, light-radiating elements and light-sensitive elements, means connecting said series circuits in parallel with each other to form a load circuit, means connecting said electronic gate means in series with said voltage source and said load circuit, said light radiating elements and said light-sensitive elements beng arranged so that said first light radiating element is exclusively optically coupled to said second light-sensitive element, said second light radiating element is exclusively optically coupled to the next light-sensitive element in the sequence, and so on, means for exciting the first light-sensitive element in the sequence thereby to initiate a cycle wherein said light sources and light radiating elements are sequentially energized in pairs as the respective series connected light-sensitive elements are sequentially illuminated by the respective light radiating elements optically coupled therewith, and control means coupled to said load circuit and to said electronic gate means and arranged to control the state of said electronic gate means so as to simultaneously de-energize said light sources and said light-radiating elements at the end of a cycle, said control means including a light-sensitive control element connected across said series circuits and optically coupled to the last one of said light radiating elements in the sequence.

11. A circuit as claimed in claim 10 wherein said control means includes time delay means controlled by said light-sensitive control element and arranged to provide a time delay between the activation of said control element and said control of said electronic gate means.

12. A circuit for sequentially energizing a plurality of electric light sources arranged in a given pattern comprising, a source of energizing voltage, electronic gate means, a plurality of light-sensitive elements, means connecting a first one of said light sources and a first one of said light-sensitive elements in a first series circuit, means connecting a second one of said light sources and a second one of said light-sensitive elements in a second series circuit, and so on in sequence including the last of said light sources and the last of said light-sensitive elements, means connecting said series circuits in parallel with each other to form a load circuit, means connecting said electronic gate means in series with said voltage source and said load circuit, said light sources and said light-sensitive elements being arranged so that said first light source is optically coupled to said first and second light-sensitive elements, said second light source is optically coupled to said second light-sensitive element and to the next light-sensitive element in the sequence, and so on, means for exciting the first light-sensitive element in the sequence thereby to initiate a cycle wherein said light sources are sequentially energized as the respective series connected light-sensitive elements are illuminated, and control means including a light-sensitive control element optically coupled to the last one of said light sources in the sequence and arranged to control the state of said electronic gate means so as to simultaneously de-energize said light sources at the end of a cycle.

13. A circuit as claimed in claim 12 further comprising a plurality of impedance elements, means connecting a first one of said impedance elements so as to bridge said first and second light-sensitive elements, means connecting a second one of said impedance elements so as to bridge said second light-sensitive element and the next light-sensitive element in the sequence, and so on including the next-to-last and the last light-sensitive elements in the sequence.

14. A circuit as claimed in claim 12 further comprising a plurality of light emitting elements, means connecting a first one of said light emitting elements in said first series circuit, means connecting a second one of said light-emitting elements in said second series circuit, and so on including the last of the series circuits.

References Cited

UNITED STATES PATENTS

| | | | |
|---|---|---|---|
| 1,988,274 | 1/1935 | Glaser | 315—151 |
| 2,078,677 | 4/1937 | Long | 315—151 |
| 3,259,794 | 7/1966 | Krawitz | 315—155 |

DAVID J. GALVIN, *Primary Examiner.*